United States Patent [19]

McCalmont

[11] Patent Number: 4,856,063
[45] Date of Patent: Aug. 8, 1989

[54] NO-OVERHEAD SYNCHRONIZATION FOR CRYPTOGRAPHIC SYSTEMS

[75] Inventor: Arnold M. McCalmont, Acton, Mass.

[73] Assignee: Technical Communication Corporation, Concord, Mass.

[21] Appl. No.: 148,930

[22] Filed: Jan. 27, 1988

[51] Int. Cl.$^4$ .............................................. H04L 9/00
[52] U.S. Cl. ..................................................... 380/48
[58] Field of Search .......................................... 380/48

[56] References Cited

U.S. PATENT DOCUMENTS

| | | | |
|---|---|---|---|
| 4,642,424 | 2/1987 | McNair | 380/48 |
| 4,736,424 | 4/1988 | Busby | 380/48 |
| 4,760,599 | 7/1988 | Okamoto et al. | 380/48 |
| 4,768,228 | 8/1988 | Clupper et al. | 380/48 |

FOREIGN PATENT DOCUMENTS

| | | | |
|---|---|---|---|
| 2943115 | 5/1981 | Fed. Rep. of Germany | 380/48 |
| 62-2738 | 1/1987 | Japan | 380/48 |

Primary Examiner—Salvatore Cangialosi
Attorney, Agent, or Firm—Nutter, McClennen & Fish

[57] ABSTRACT

Synchronization information for synchronizing encrypting and decrypting key generators (12 and 16) in a secure communications link (10) is transmitted without exacting a bandwidth penalty. Pointer comparators (17 and 18) at the transmission and reception ends of the link monitor the cipher text transmitted between the generators to determine whether it includes a predetermined naturally occurring sequence of bits, referred to as a "pointer" sequence. Upon the occurrence of the pointer sequence, the pointer comparators (17 and 18) trigger synchronization circuits (20 and 22) to read a sequence in the cipher text that occurs a predetermined period of time after the occurrence of the pointer. Accordingly, both synchronization circuits (20 and 22) read the same cipher-text sequence, which is a naturally occurring part of the cipher text. In response, one of the synchronization circuits (20) places the encrypting key generator (12) into a state designated by the naturally occurring sequence that that synchronization circuit (20) has read, while the other synchronization circuit (22) places the decrypting key generator (16) into the corresponding state. In this way, the encryption and decryption ends of the data link are synchronized without any bandwidth penalty.

2 Claims, 1 Drawing Sheet

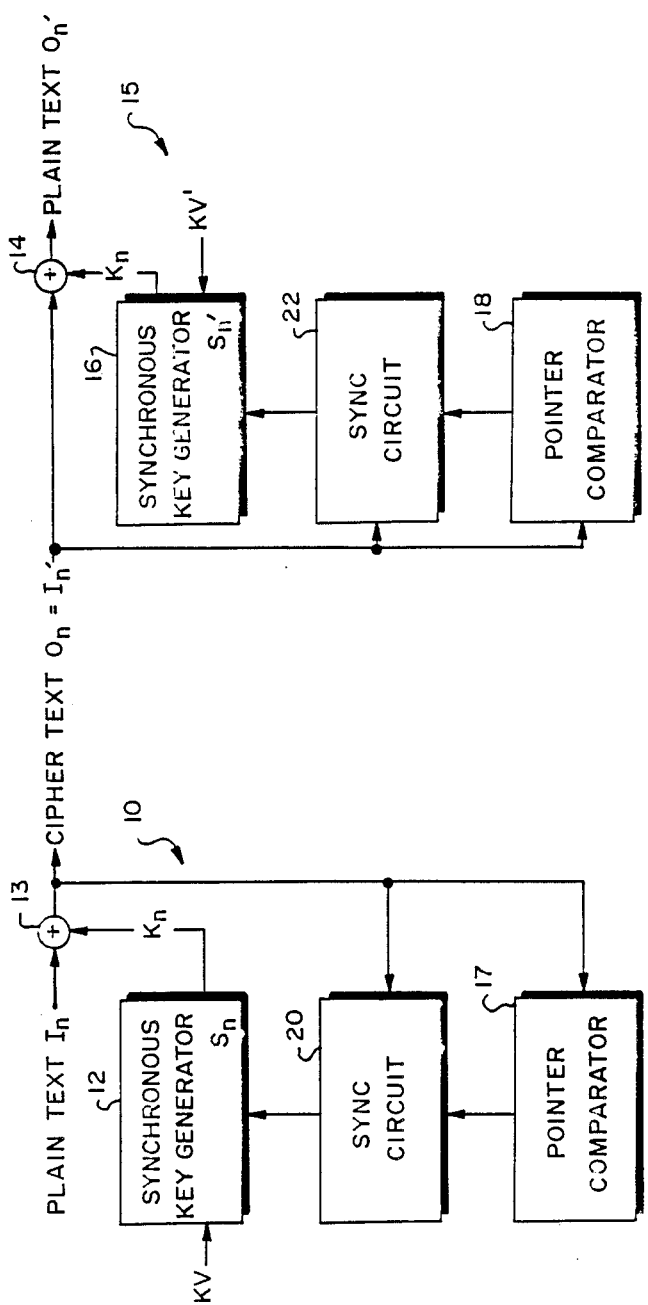
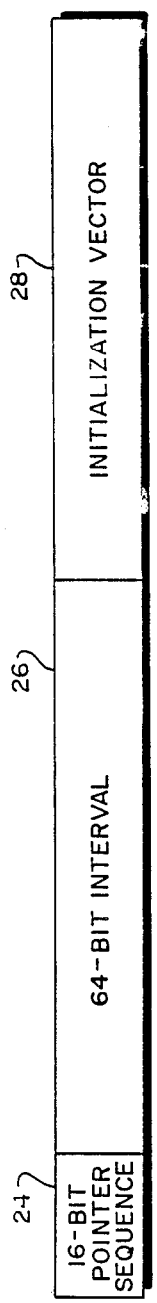
FIG. 1
FIG. 2

NO-OVERHEAD SYNCHRONIZATION FOR CRYPTOGRAPHIC SYSTEMS

BACKGROUND OF THE INVENTION

The present invention is directed to cryptographic communications systems, and it is directed particularly to the communication of synchronization information.

In a cryptographic communication system, the encryption/transmission and decryption/reception systems must be "in step" with each other to operate properly.

A common type of cryptographic communications system will illustrate this requirement. In this type of system, the encryption unit includes a so-called key generator, which produces a pseudo-random key stream. To generate a cipher signal, such an encryption system performs a logical operation, such as modulo-2 addition by means of an exclusive-OR gate, on the plain-text message and the key stream. The corresponding decryption system performs modulo-2 addition of the cipher text to the output of an identical key-stream generator to recover the plain text.

This type of communication system works because the two key generators, which can be set to key-variable (code) settings, are identical and so produce identical key streams when set to the same codes. For the system to operate properly, however, not only must the key streams be identical and set to the same codes, but they must be in synchronism: in deciphering a particular bit in the cipher text, the decryption unit must be at a point in the key stream the same as that at which the encryption unit was when it produced that cipher-text bit.

This synchronism requirement presents a problem because units that start out a message in synchronism can fall out of synchronism due to anomalies in the communication system, and once that happens the whole remainder of the message is lost if no steps are taken to re-synchronize. Loss of synchronization usually results from vagaries in the communication system rather than in the key generators.

In some systems, notably those of the cipher-feedback type, synchronism is automatically restored after a predetermined number of bits because of the way in which the key stream is generated, so no separate steps need to be taken to restore synchronization. But other types of keystream generators do not inherently include such an automatic re-synchronization feature and therefore need separate means of restoring synchronization. This is usually provided by transmission of synchronization signals ahead of or along with the ciphered message; the synchronization signals place the decryption-unit key generator in a predetermined point in its key stream so that it is restored to synchronization with the encryption unit.

Unfortunately, this transmission of synchronization signals is overhead: it exacts a price in bandwidth. An object of the present invention is to reduce or eliminate the bandwidth price of transmitting such synchronization information.

SUMMARY OF THE INVENTION

The foregoing and related objects are achieved in a cryptographic communication system in which the synchronization information is carried by naturally occurring bit sequences in the cipher text itself; cipher-text bits serve not only as the message but also as carriers of synchronization information.

Specifically, a comparator device at the transmitting end monitors the cipher text for a predetermined sequence of bits. The sequence has preferably been predetermined by statistical analysis of previous traffic on the channel so that the sequence can be expected to occur naturally in the cipher text with a sufficiently high frequency. This sequence is referred to as a "pointer sequence," and it indicates that a sequence of bits occurring a predetermined number of bits later in the naturally occurring cipher text should be interpreted not only as cipher text but also as a synchronization signal. Accordingly, a reading device at the transmitting end captures a segment of the cipher signal designated by the time of occurrence of the pointer signal. Circuitry at the transmitting end interprets that segment as a synchronization signal and places the encryption unit in a state indicated by the contents of the synchronization signal. In the case of a key-stream encryption system, for example, it sets the key generator to the designated state.

The same operation occurs at the receiving end: the cipher signal is monitored for the pointer sequence, and the contents of a segment of the cipher signal determined by the time of occurrence of the pointer sequence are used to set the state of the decryption circuitry. In this way, the transmission and reception ends of the communication link are coordinated without any bandwidth overhead.

BRIEF DESCRIPTION OF THE DRAWINGS

These and further features and advantages of the present invention are described in connection with the accompanying drawings, in which:

FIG. 1 is a block diagram of a secure communications link that embodies the present invention; and FIG. 2 is a diagram of a cipher signal stream illustrating the operation of the present invention.

DETAILED DESCRIPTION OF AN ILLUSTRATIVE EMBODIMENT

FIG. 1 depicts an encryption/transmission device 10 that embodies the teachings of the present invention. The heart of the system is a synchronous key generator 12, which may be any one of a number of conventional types of such generators. Such generators can be thought of as being characterized at any discrete time interval n by a state $S_n$, which indicates where in the key-stream sequence the key-generator output is. The key-stream sequence itself is set by a code KV (Key Variable), which may be dialed in by the user with the intention that the same code be dialed in at the receiving end. The output $K_n$ of the key generator 12 is added by a modulo-two adder to the plain text $I_n$ to generate cipher text $O_n$. The key generator 12 and adder 13 together thus constitute a cipher-text generator. Another modulo-two adder 14, this one in a reception/decryption system 15, receives as its input $I_n'$ the cipher text $O_n$. Adder 14 modulo-two adds the cipher text to the key stream $K_n'$ produced by a decryption key generator 16.

The result is an output $O_n'$, which is equal to the original plain-text input $I_n$ if the decryption state $S_n'$ of the plain-text generator corresponds to the state $S_n$ of the transmitting key generator 12.

For various reasons, key generators 12 and 16 can lose synchronization—i.e., can assume non-corresponding states—so that the ultimate output $O_n'$ is garbled. To prevent the entire message from being garbled, therefore, synchronization signals are sent from time to time to place the transmission and reception ends in synchronization by setting them to corresponding states. According to the present invention, this information is exchanged, without adding to the message signal, by means of pointer comparators 17 and 18 and synchronization circuits 20 and 22. Pointer comparator 17 compares the cipher signal $O_n$ n with a predetermined pointer sequence. Specifically, pointer comparator 17 treats each output bit, together with the preceding fifteen output bits, as a sixteen-bit sequence. This sequence is compared, typically by sixteen XOR gates, with the predetermined pointer sequence, and if the sixteen-bit sequence in the output $O_n$ is the same as the pointer sequence, pointer comparator 17 generates a trigger signal that it transmits to synchronization circuit 20.

In response to the trigger signal, synchronization circuit 20 times out a predetermined delay—sixty-four bit times in the illustrated embodiment—and then begins reading and storing the cipher-text output $O_n$, continuing to do so until it has stored sixty-four bits. It then interprets the stored sixty-four-bit sequence as an initialization vector that designates a generator state $S_n$ and applies coordination signals to the cipher-signal generator 12 to place it in the state $S_n$ indicated by the sixty-four-bit sequence.

At the same time, pointer comparator 18 at the receiving end also detects the pointer sequence and also causes its synchronization circuit 22 to read a sixty-four-bit sequence that begins sixty-four bits after the occurrence of the pointer sequence. Synchronization circuit 22 then places the decrypting key generator 14 in the state $S_n'$ designated by the sixty-four-bit sequence.

The format depicted in FIG. 2 illustrates this operation. The pointer comparator constantly monitors a sixteen-bit-long segment 24 of the output. When the contents of segment 24 equal the predetermined pointer, a sixty-four bit interval 26 in the output $O_n$ is allowed to pass, and the contents of the subsequent sixty-four-bit interval 28 is then recorded and treated as an initialization vector for placing the ciphering and deciphering key generators 12 and 16 into the states determined by that vector.

Thus, the generators 12 and 14 are placed into corresponding states. Note that this has been accomplished without adding any bits to the cipher text, which itself has acted as the synchronization information.

It is clear that this principle can be employed in a wide variety of variations. For instance, the previous discussion was based on the assumption that the output $O_n$ was transmitted in bit-serial form. For parallel data, the sixteen-bit pointer could be, for instance, a single bit from each line in a sixteen-bit-wide communications path. Additionally, more than one pointer sequence could be employed, so the pointer comparators 17 and 18 could trigger the coordinators 20 and 22 upon the occurrence of any one of a plurality of pointer sequences.

Moreover, the different pointer sequences could be used for different purposes. For instance, a sequence 28 could be treated as an initialization vector in response to one pointer sequence but as an encryption key KV—i.e., a bit sequence that does not determine the point in the key stream but rather is the secret code KV itself—in response to some other pointer sequence.

In another alternative, the sixty-four-bit sequence 28 occurring sixty-four bits after the pointer sequence could be interpreted either as only an initialization vector or only an encryption key. Of course, the pointer sequence does not have to be sixteen bits long; it can be of any length, as can the subsequent recorded sequence.

It is apparent as a result of the foregoing description that transmission of coordination information in accordance with the teachings of the present invention achieves coordination between the encryption and decryption systems without exacting any bandwidth penalty. The present invention thus constitutes a significant advance in the art.

I claim:

1. An encryption system comprising:
A. a cipher-signal generator for assuming in succession a plurality of generator states, for receiving plain-text input signals, and for generating cipher signals determined by both the plain text input and the generator state, the cipher-signal generator normally assuming a generator state independent of the cipher signal but being operable by application of synchronization signals thereto to assume a generator state dictated by the synchronization signals;
B. a pointer detector for monitoring the cipher signal for a predetermined pointer sequence and generating a trigger signal only in response to the occurrence of the pointer sequence; and
C. a synchronization circuit, responsive to the trigger signal to read the contents of the cipher signal that occur at a time determined by the time of occurrence of the pointer sequence, for applying to the keystream generator synchronization signals determined by those contents and thereby placing the cipher-signal generator in the generator state dictated thereby.

2. A decryption system comprising:
A. a plain-text generator for assuming in succession a plurality of generator states, for receiving cipher input signals, and for generating plain-text signals determined by both the cipher input and the generator state, the key-stream generator normally assuming a generator state independent of the cipher signal but being operable by application of synchronization signals thereto to assume a generator state dictated by the synchronization signals;
B. a pointer detector for monitoring the cipher signal for a predetermined pointer sequence and generating a trigger signal only in response to the occurrence of the pointer sequence; and
C. a synchronization circuit, responsive to the pointer detector to read the contents of the cipher signal that occur at a time determined by the time of occurrence of the pointer sequence, for applying to the plain-text generator synchronization signals determined by those contents and thereby placing the plain-text generator in the generator state dictated thereby.

* * * * *